United States Patent
Lim et al.

(10) Patent No.: US 9,265,078 B2
(45) Date of Patent: Feb. 16, 2016

(54) METHOD FOR PERFORMING DEVICE-TO-DEVICE COMMUNICATION IN WIRELESS ACCESS SYSTEM AND APPARATUS THEREFOR

(75) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 14/115,173

(22) PCT Filed: May 2, 2012

(86) PCT No.: PCT/KR2012/003442
§ 371 (c)(1),
(2), (4) Date: Nov. 1, 2013

(87) PCT Pub. No.: WO2012/150815
PCT Pub. Date: Nov. 8, 2012

(65) Prior Publication Data
US 2014/0057670 A1  Feb. 27, 2014

Related U.S. Application Data

(60) Provisional application No. 61/481,691, filed on May 2, 2011.

(51) Int. Cl.
  *H04W 76/02* (2009.01)
  *H04W 8/00* (2009.01)
  *H04W 48/16* (2009.01)

(52) U.S. Cl.
  CPC ............ *H04W 76/023* (2013.01); *H04W 8/005* (2013.01); *H04W 48/16* (2013.01)

(58) Field of Classification Search
  USPC ........ 455/450, 425, 452.2, 423, 456.1, 426.1, 455/519, 509, 39, 518, 11.1, 67.11; 370/331, 310, 328, 248, 352, 324, 338, 370/315, 252
  See application file for complete search history.

(56) References Cited

U.S. PATENT DOCUMENTS

| | | | | |
|---|---|---|---|---|
| 2005/0239451 A1* | 10/2005 | Periyalwar | .......... | H04W 52/383 455/425 |
| 2006/0040693 A1* | 2/2006 | Yoon | ................... | H04W 76/005 455/519 |

(Continued)

FOREIGN PATENT DOCUMENTS

| KR | 10-2010-0088773 | 8/2010 |
|---|---|---|
| WO | 2007/055993 | 5/2007 |

OTHER PUBLICATIONS

Johnsson, et al., "Client Cooperation in Future Wireless Broadband Networks," IEEE 802.16 Presentation Submission Template (Rev. 9), IEEE C802.16-10/0005r1, Jan. 2010, 16 pages.

(Continued)

*Primary Examiner* — Ganiyu A Hanidu
(74) *Attorney, Agent, or Firm* — Lee, Hong, Degerman, Kang & Waimey

(57) ABSTRACT

The present invention provides a method for performing device-to-device communication in a wireless access system that supports the device-to-device communication and an apparatus therefor. Specifically, the invention comprises the steps of: receiving, from a base station, device-to-device communication parameters for broadcasted device-to-device communication; transmitting a detection signal to one or more devices using the received device-to-device communication parameters; receiving, from the one or more devices, link measurement information for measuring a link between a first device and the one or more devices using the detection signal; selecting a second device for performing the device-to-device communication from the one or more devices using the link measurement information; and performing the device-to-device communication with the selected second device.

14 Claims, 7 Drawing Sheets

(56) References Cited

U.S. PATENT DOCUMENTS

| | | | |
|---|---|---|---|
| 2008/0013459 A1* | 1/2008 | Do | H04W 40/12 370/248 |
| 2010/0261469 A1* | 10/2010 | Ribeiro | H04W 99/00 455/423 |
| 2011/0275382 A1* | 11/2011 | Hakola | H04W 24/10 455/452.2 |
| 2012/0258706 A1* | 10/2012 | Yu | H04W 56/0045 455/426.1 |
| 2012/0302254 A1* | 11/2012 | Charbit | H04W 4/005 455/456.1 |

OTHER PUBLICATIONS

PCT International Application No. PCT/KR2012/003442, Written Opinion of the International Searching Authority dated Nov. 23, 2012, 19 pages.

* cited by examiner

METHOD FOR PERFORMING DEVICE-TO-DEVICE COMMUNICATION IN WIRELESS ACCESS SYSTEM AND APPARATUS THEREFOR

CROSS-REFERENCE TO RELATED APPLICATIONS

This application is the National Stage filing under 35 U.S.C. 371 of International Application No. PCT/KR2012/003442, filed on May 2, 2012, which claims the benefit of U.S. Provisional Application Ser. No. 61/481,691, filed on May 2, 2011, the contents of which are hereby incorporated by reference herein in their entirety.

TECHNICAL FIELD

The present invention relates to a mobile communication system, and more particularly, to a method for performing device-to-device (D2D) communication in a wireless access system supporting D2D communication and an apparatus therefor.

BACKGROUND ART

To perform cellular communication, a terminal present in a cell accesses a base station, receives control information for transceiving of data from the base station, and then transmits and receives data to and from the base station. That is, the terminal transceives data via the base station. Accordingly, to transmit data to another cellular terminal, the terminal transmits the data thereof to the base station and the base station in turn transmits the received data to another terminal. Since a terminal is allowed to transmit data to anther terminal only via a base station, the base station performs scheduling of channels and resources for transmission and reception of data and transmits the channel and resource scheduling information to each terminal. While communication between terminals via a base station requires allocation of channels and resources by the base station allowing the terminals to transmit and receive data, D2D communication allows a terminal to directly transmit and receive a signal to and from another terminal to which the terminal desires to transmit data, without assistance from a base station or a repeater.

DISCLOSURE

Technical Problem

An object of the present invention devised to solve the problem lies in a wireless access system, preferably a method for performing device-to-device communication in a wireless access system that supports device-to-device communication and an apparatus therefor.

The present invention is not limited to the aforementioned objects. Other objects of the present invention not mentioned above will be clearly understood by those skilled in the art from the following description.

Technical Solution

The object of the present invention can be achieved by including the steps of a first device receiving, from a base station, device-to-device communication parameters for broadcasted device-to-device communication, the first device transmitting a detection signal to one or more devices using the received device-to-device communication parameters, the first device receiving, from the one or more devices, link measurement information for measuring a status of a device-to-device link between the one or more devices and the first device using the detection signal, the first device selecting a second device for performing the device-to-device communication from the one or more devices using the link measurement information, and the first device performing the device-to-device communication with the selected second device.

In another aspect of the present invention, provided herein is a processor to transmit, after receiving device-to-device communication parameters for broadcasted device-to-device communication from a base station, a detection signal to one or more devices using the received device-to-device communication parameters, and to select, when receiving, from the one or more devices, link measurement information for a status of a device-to-device link to the device measured by each of the one or more devices using the device-to-device communication parameters, another device for performing the device-to-device communication from the one or more devices, using the link measurement information and perform the device-to-device communication with the selected another device.

Preferably, the device-to-device communication parameters may include threshold information for determining the device-to-device communication, wherein the second device for performing the device-to-device communication may be selected by comparing the threshold information with the link measurement information.

Preferably, the device-to-device communication parameters may include a list of device-to-device connection identifiers, and a connection identifier for identifying device-to-device connection to the selected second device from the list of device-to-device connection identifiers may be determined.

Preferably, a device-to-device communication confirmation signal containing at least one of an identifier of the second device, the connection identifier (connection ID) for identifying device-to-device connection to the second device, and a start indication of the device-to-device communication with the second device may be transmitted to the base station and the second device.

Preferably, the device-to-device communication parameters may include a list of devices supporting the device-to-device communication, wherein the detection signal may be transmitted to the one or more devices belonging to the received list of devices.

Preferably, a device-to-device communication request signal may be transmitted to the base station, to start the device-to-device communication with the second device, and a communication response signal containing at least one of modulation and coding scheme (MCS) for performing the device-to-device communication with the second device, power level, resource allocation, Multiple Input Multiple Output (MIMO), and connection identifier (connection ID) information may be received from the base station.

Preferably, the device-to-device communication parameters may include at least one of resource allocation information for performing the device-to-device communication, configuration information of the detection signal, time and frequency offset information for device-to-device synchronization, and timer offset information for time duration up to a time point of reception of the measurement information in response to the detection signal.

Advantageous Effects

According to an embodiment of the present invention, by providing a wireless access system, preferably a method for performing device-to-device communication in a wireless access system that supports device-to-device communication, an efficient communication environment may be created.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
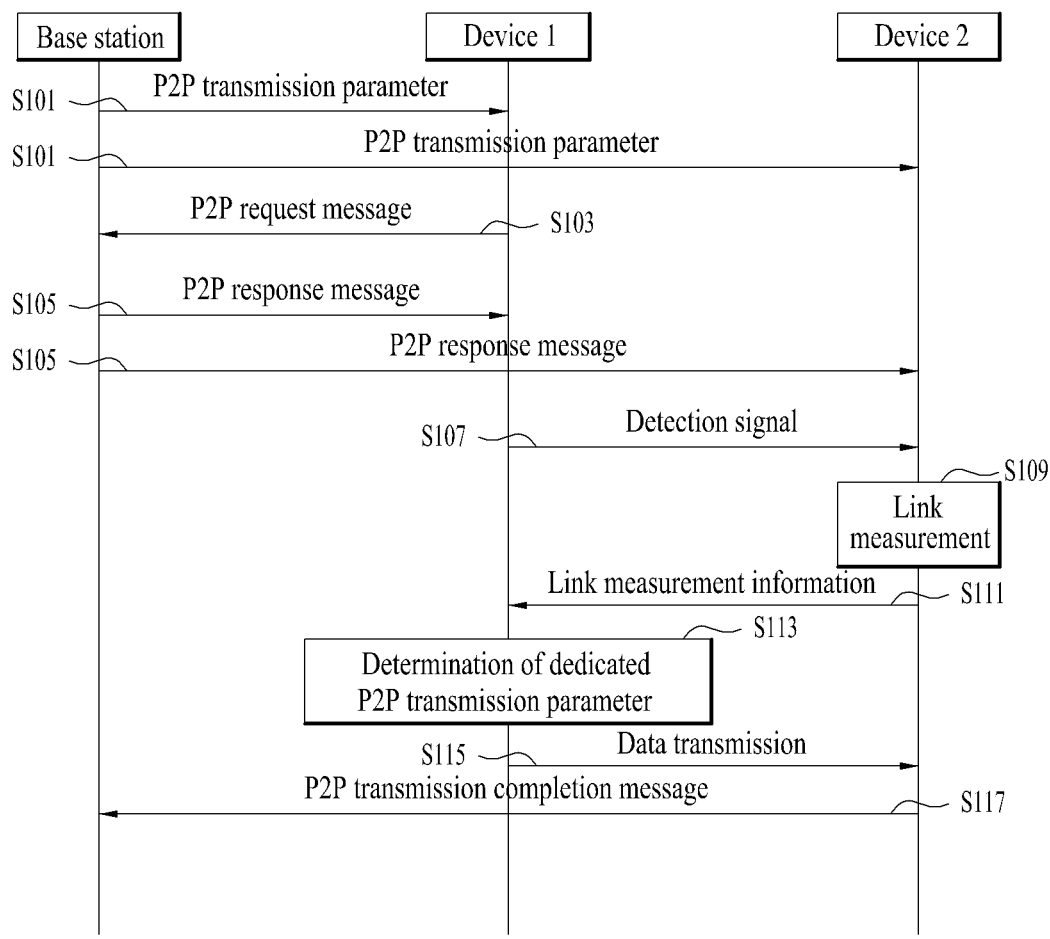
FIG. 1 is a view illustrating a method based on a first scheme for performing device-to-device communication according to an exemplary embodiment of the present invention.

Reference will now be made in detail to the embodiments of the present invention, examples of which are illustrated in the accompanying drawings. The detailed description given below in conjunction with the accompanying drawings is intended to illustrate exemplary embodiments of the present invention, and not to present only the embodiments of the present invention that can be implemented. The following detailed description provides specific details to aid in fully understanding the present invention. However, it will be appreciated by those skilled in the art that the present invention may be implemented without these details.

In some cases, illustration of well-known structures and devices may be omitted to avoid obscuring the concept of the present invention, or each of the structures and devices will be illustrated with block components representing essential functions thereof.

In this specification, description of the embodiments of the present invention will be given below, focusing on a relationship between a base station and a terminal in data transmission and reception. Herein, the base station serves as a terminal node of a network that communicates directly with the terminal. In some cases, a specific operation described as performed by the base station may be performed by an upper node of the base station. Namely, it is apparent that, in a network comprised of a plurality of network nodes including a base station, various operations performed for communication with a terminal may be performed by the base station or network nodes other than the base station. The term 'base station (BS)' may be replaced with the term 'fixed station', 'Node B', 'eNode B (eNB)', or 'Access Point (AP)'. The term 'repeater' may be replaced with the term 'Relay Node (RN)' or 'Relay Station (RS)'. In addition, the term 'terminal' may be replaced with the term 'User Equipment (UE)', 'Mobile Station (MS)', or 'Mobile Subscriber Station (MSS)'.

Specific terms employed in the description are provided to aid in understanding of the present invention. These specific terms may be replaced with other terms within the scope and spirit of the present invention.

The embodiments of the present invention can be supported by standards documents for at least one of wireless access systems including Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

The embodiments of the present invention disclosed below can be applied to a variety of wireless access technologies such as, for example, CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier Frequency Division Multiple Access. CDMA may be implemented through wireless (or radio) technologies such as UTRA (Universal Terrestrial Radio Access) and CDMA2000. TDMA may be embodied through wireless technologies such as GSM (Global System for Mobile communications)/GPRS (General Packet Radio Service)/EDGE (Enhanced Data Rates for GSM Evolution). OFDMA may be implemented through wireless technologies such as IEEE 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

1. Device-to-Device (D2D) Communication

In the present invention, direct communication between terminals refers to a method by which two or more terminals perform direct communication with each other without assistance from a base station when conditions of the channel between the terminals are good or when the terminals neighbors each other. This method is distinguished from Bluetooth communication and infrared communication, in which terminal exchange data without involving the base station, in that when the terminals associated with the present invention exchange data with each other through direct communication, predetermined control information is provided by the base station.

In the case of client cooperative communication, terminal B assisting other terminals in communication receives data to be transmitted to the base station from terminal A and transmits the same to the base station, or receives data to be transmitted to terminal A from the base station and transmits the same to terminal A. At this time, unidirectional or bidirectional communication between terminals is performed within the bandwidth of a system. Accordingly, client cooperative communication may be viewed as an example of terminal-to-terminal communication. Client cooperative communication is applicable to uplink transmission through cooperation between terminals, and is also applicable to downlink transmission through cooperation between a base station and a terminal, between base stations, or between antennas of a distributed antenna system (DAS)

As discussed above, terminal A usually exchanges data and/or control information with the base station via terminal B. However, in some conditions, it may directly exchange data and/or control information. That is, considering conditions of a channel to the base station and a channel to terminal B, terminal A may directly exchange data with the base station. At this time, the data and/or control information that terminal A directly exchanges with the base station may be identical to or different from the data and/or control information that terminal A exchanges with the base station via terminal B.

A wireless communication system may support both direct communication and client cooperative communication, or only one thereof. In the case that the wireless communication system supports both direct communication and client cooperative communication, a message requesting direct communication may be different from or identical to a message requesting client cooperative communication.

The term "direct communication" or "client cooperative communication," may be mixed with the term "terminal-to-terminal communication (D2D communication/M2M (MS-to-MS) communication)" or pear-to-peer (P2P) communication. For convenience of description, the term "P2P communication" will be generally used in describing the embodiments of the present invention. In addition, in this specification, the term "P2P device" refers to a terminal that can support P2P communication.

2. Method for Performing P2P Communication

Among devices present in a cell, a device that supports P2P communication may receive control information transmitted from a base station, thereby receiving data from another P2P device through P2P communication. A control signal transmitted from the base station to perform P2P transmission, signaling for P2P device-to-P2P device transmission, and a method of P2P transmission according to the base station are as follows. P2P devices and the base station may perform P2P communication by one or a combination of methods described below.

In addition, for convenience of description, four schemes for start of P2P communication disclosed below will be described as an example of P2P transmission between two devices. These schemes are also applicable to P2P transmission between one device and multiple other devices.

2.1. First Scheme for P2P Communication

FIG. 1 is a view illustrating a method based on a first scheme for performing device-to-device communication according to an exemplary embodiment of the present invention.

Referring to FIG. 1, the base station transmits P2P transmission parameters to devices (Device 1 and Device 2) supporting P2P communication through broadcast signaling (S101). At this time, as broadcast signaling, P2P transmission Advanced-MAP (A-MAP) Information Element (IE), beacon signaling, Physical Broadcast Channel (PBCH), Physical Downlink Control Channel (PDCCH), and paging signals may be used.

In addition, in the case that a device accesses the base station to indicate P2P operation, the base station may transmit P2P transmission parameters to the device using unicast signaling or multicast signaling since devices capable of performing P2P communication are known to the base station among the devices in the cell. In the case that the base station transmits parameters through multicast signaling, the base station may transmit multicast information through group transmission parameter allocation (P2P_GTA) such that the corresponding devices may detect multicast information.

Since P2P transmission parameters are transmitted through broadcast signaling, all devices present in a cell may know information about P2P transmission parameters.

P2P transmission parameters that the base station transmits through broadcast signaling are shown in Table 1.

TABLE 1

| Parameter | | Contents |
|---|---|---|
| Request & Response Resource Allocation | | Resource allocation information about a resource area for transceiving a request signal or a response signal that a P2P device transmits to the base station for P2P device-to-device link formation/measurement |
| List of Status of P2P Wireless Device | | Information about operational statuses of respective P2P devices |
| Quality of Service of Device and Threshold Value for P2P Transmission | | Information about threshold value and quality of service for P2P transmission |
| Retransmission Parameters | Timer Offset for Retransmission of Request Signal | Information about timer for retransmission of a request signal for P2P transmission |
| | Number of Retransmission of P2P Transmission Request | Information about the number of retransmissions of a request signal for P2P transmission |
| Sequence Indication or Sequence of Request Signal for P2P Transmission | | Information about sequence of a request signal for P2P transmission |

The Request & Response Resource Allocation parameter represents resource allocation information for allocation of resource areas in which a P2P device transmits a request signal or a response signal to the base station to form an P2P device-to-device transmission link or measure the P2P device-to-device link. Since a common resource is allocated to all devices in a cell, P2P wireless devices contend with each other through the allocated common resource to perform P2P transmission. That is, the common resource may be allocated through broadcast signaling, but in the case of allocation of request and response resources through the unicast or multicast signaling, a dedicated resource may be allocated to a device.

The List of Status of P2P Wireless Device parameter represents operational statuses of the respective P2P devices. The operational statuses of a P2P device include idle mode, sleep mode, and active mode. Herein, an operational mode presents the status of the P2P device currently performing P2P transmission of data to the base station When all the devices in a cell access the base station, the base station may know whether the devices are capable of performing P2P communication using capability negotiation between the base station and the devices or a P2P communication supporting indication of the devices. The status of each P2P device in a cell may be known from feedback information produced through data transmission by the devices capable of performing P2P communication or current device status information (CD_Status_info) that the devices. The status information about the respective P2P devices acquired by the base station is listed up and stored in a table or a bit map.

Herein, the List of Status of P2P Wireless Device parameter may include only the status information about the P2P devices in the idle mode or the sleep mode, or may further include the status information about the P2P devices in the active mode.

In the case that the parameter includes only the status information about the P2P devices in the idle mode or the sleep mode, a P2P device selects a target device (Device 2 in this embodiment) among the P2P devices which are in the List of Status of P2P Wireless Device transmitted from the base station and are not currently performing communication with the base station, and then transmits a P2P request message to the base station to perform P2P communication. At this time, in the case that a P2P device with which the device desires to perform P2P communication is not in the received list, the device may refrain from P2P transmission or may make another request for the list of statuses of the P2P wireless devices to the base station.

On the other hand, in the case that the above parameter further includes the status information about the P2P devices in the active mode, when the P2P device selects a P2P device in the active mode as a target device, the base station transmits an indication/confirmation response to the device that has requested P2P communication. That is, the base station informs the device of whether or not the target device is capable of performing P2P communication (Yes/No). Specifically, when a P2P device in the active mode is selected as the target device for P2P transmission, the base station transmits an indication/confirmation message for P2P transmission to the device that has requested P2P communication in consideration of the current transmission status of the device. In addition, when P2P transmission is determined for the selected P2P device, the base station transmits, to the device having requested P2P communication, not only the indication/confirmation message but also a Wait parameter for P2P communication in consideration of transmission to the base station by the P2P device. Herein, the Wait parameter includes a latency value (or delay value), start time offset, and timer offset. The P2P device may determine whether to perform P2P communication based on the time information transmitted from the base station. In the case that the P2P device determines to perform P2P communication, after the P2P device waits for the time in the received time information or after the waiting timer expires, the P2P device transmits the P2P request message to the base station. That is, priority may be given to the transmission operation between the P2P device and the base station rather that to the P2P device-to-device transmission.

Meanwhile, since the List of Status of P2P Wireless Device transmitted from the base station is a device list configured with terminals having a P2P transmission capability, the base station may broadcast a list of terminals which are currently in the idle mode or sleep mode with respect to the base station among all the terminals with the P2P transmission capability in the cell. In this case, the amount of the broadcasted list of terminals may be excessively large, and therefore the list may be individually transmitted to the respective terminals in the unicast scheme rather than the broadcasting scheme or may be transmitted in the multicast scheme, in which the terminals are grouped and the list is transmitted to each group. For example, the base station may transmit and receive signals to and from the devices (including both the devices supporting P2P communication and the devices not supporting P2P communication), thereby perceiving locations of the devices in the cell based on the feedback information or location information transmitted from the devices. Accordingly, when a P2P device transmits a P2P request message to the base station to perform P2P transmission, only the list of statuses of P2P wireless devices for P2P devices neighboring the device having requested P2P communication may be transmitted. For example, only the list of terminals having a distance from the device having requested P2P communication less than a predetermined threshold value may be transmitted. At this time, the number of devices included in the List of Status of P2P Wireless Device transmitted from the base station is not limited. However, since only the list of neighboring devices is transmitted, control overhead in transmitting the List of Status of P2P Wireless Device may be reduced. In addition, when the multicast scheme is used, the base station is capable of transmitting the list of devices of a group to which the device having requested P2P communication belongs, and therefore a list of the devices belonging to another group neighboring the group to which the device having requested P2P communication belongs may also be transmitted.

The parameter Quality of Service of Device and Threshold Value for P2P Transmission represents a threshold value for determination of P2P transmission and quality of service required for P2P transmission.

Retransmission parameters represent information for retransmission of a request message of requesting P2P communication to the base station by a P2P device. The retransmission parameters include the Timer Offset for Retransmission of Request Signal and the Number of Retransmission of P2P Transmission Request. The Timer Offset for Retransmission of Request Signal is information about the time duration from the time the P2P device transmits a P2P communication request signal to the base station until the response signal is received from the base station. If the P2P device fails to receive the response signal from the base station before the timer expires, it retransmits the request signal.

The Sequence Indication or Sequence of Request Signal for P2P Transmission parameter represents information about a request signal for request for P2P retransmission to the base station by the devices supporting P2P transmission among the devices in the cell. For the request signal, a common sequence may be used in each cell or a different sequence may be used in each cell. The Sequence Indication or Sequence of Request Signal for P2P Transmission is information about a common sequence used in a cell or a set of plural sequences. Using an device identifier for the sequence, the device that receives information about the request signal implements a cyclic shift and transmits the request signal, or transmits the request signal to the base station by selecting one in the set of sequences. The sequence that the P2P device uses may be obtained from the function R(Device_ID) which uses the device identifier. In the case that the P2P device has the information about the request signal, the Sequence Indication or Sequence of Request Signal for P2P Transmission is not transmitted by the base station. In addition, since the resource information is transmitted through broadcast signaling as discussed above, a request for P2P transmission by the P2P device is made based on contention.

Again referring to FIG. 1, among the P2P devices having received the P2P transmission parameters from the base station through broadcast signaling, a device desiring P2P transmission through the P2P transmission parameters selects one in the list of the P2P devices having received the identifier from the P2P device desiring P2P connection and transmits the indication or information for a corresponding P2P device to the base station using a P2P request message (signal) (S103).

At this time, the P2P request message transmitted from the P2P device includes the identifier of the P2P device (the P2P device transmitting the request message), is configured with the identifier thereof. For example, a sequence configuring the P2P request message may be selected as the device identifier (Device_ID) of the device making a request or may be configured with a cyclic shift value or a hopping value using the device identifier of the device making a request for the common sequence. Herein, the sequence for request for P2P communication may be predetermined or may be known from a broadcast signal received from the base station.

The P2P request message transmitted from the P2P device contains information such as a request indication, a target/associated device ID, a QoS, a device capability, and interference information. Examples of the interference information may include signal to interference plus noise ratio (SINR), signal to interference ratio (SIR), and interference level. In addition, an example of the QoS information may be QoS information required for reproduction of audio/video streams.

Meanwhile, in the case that the identifier of a device to which the P2P device desires link connection, i.e. the identifier of a device for transmission of a signal is not contained in the received list of devices, the P2P device may wait until a next broadcast signal is transmitted. Alternatively, the P2P device may find a desired target device in the received list and make a request to the base station.

As discussed above, if the P2P device having transmitted a P2P request message fails to receive a response message (signal) before the timer expires after transmission of the request message, it retransmits the request message to the base station. At this time, the number of retransmissions is determined by the P2P transmission parameters received from the base station. In the case that the P2P device fails to receive a response message from the base station even after the P2P request message is retransmitted to the base station by the determined number of times of retransmission, the P2P device refrains from P2P transmission.

As discussed above, transmission of the request message (P2P_REQ) transmitted by the P2P device to perform P2P transmission may be performed, for example, using bandwidth request signaling (BW-REQ signaling) that the device transmits to the base station. That is, a device desiring P2P transmission may make a request for P2P communication to the base station through the BW-REQ signaling carrying P2P request information.

Upon receiving the P2P request message from P2P device, the base station transmits a P2P response message to the intended device and the device having requested P2P transmission, using the target device identifier or indication information contained in the request message (S105). At this time, the base station transmits the P2P response message to each P2P device through unicast signaling.

Information contained in a P2P response message that the base station transmits to the two P2P devices for P2P transmission is shown in Table 2.

TABLE 2

| Parameter | Contents |
| --- | --- |
| Frame or Time Slot Information for P2P Transmission | Information about a frame or a time slot for P2P transmission |
| Resource Allocation for P2P Data Transmission | Information about resource allocation for a resource area for data transmission in P2P transmission |
| Link Connection Identifier or Flow Identifier | Information about a link connection identifier or a flow identifier |
| Time or Frequency Offset | Information about time or frequency offset |
| Pilot Signal Indication or Information | A pilot signal indication or information |

TABLE 2-continued

| Parameter | Contents |
| --- | --- |
| Threshold for P2P Transmission | Information about a threshold value for determining P2P transmission |
| Power Control Information | Information about power control for P2P transmission |
| P2P Grouping/Paring ID | Information about P2P grouping/pairing |
| P2P Device Identifier | Information about a P2P device identifier |

The Frame or Time Slot Information for P2P Transmission parameter represents information about the structure of a frame or a time slot used in P2P transmission.

The Resource Allocation for P2P Data Transmission parameter represents resource allocation information about a resource area allocated for P2P device-to-device data transmission. Upon receiving request messages for P2P transmission from the devices supporting P2P communication, the base station may receive request messages for P2P transmission from multiple devices for the same P2P device. At this time, the base station may determine the device to perform P2P transmission in consideration of capability/interference info/QoS contained in a request message transmitted from each of the transmitters having requested P2P transmission. For example, if another device other than Device 1 also desires P2P communication with Device 2, the base station compares information transmitted from one device with information transmitted from anther, and then may give priority to a device having a higher capability or QoS or having less interference, or determine to allow the device to perform P2P transmission first. At this time, to set the transmission opportunity average for the entire P2P link to be uniform, the P2P transmitter may be set in consideration of the P2P transmission opportunity parameter when a device is determined Setting the transmission opportunity average to be uniform means that the resource allocation opportunity is equally provided to both the case of having good link status between P2P devices and the case of having bad link status between P2P devices.

The Link Connection Identifier or Flow Identifier parameter represents information about an identifier to identify a link or flow formed between the P2P devices. The base station allocates an identifier that is not used in connection between other P2P devices, as a link connection identifier or a flow identifier. Alternatively, an identifier that may less interfere with connection between other P2P devices may be repeatedly allocated. At this time, connection/flow identifiers and resources allocated for P2P transmission between P2P devices may be in one-to-one correspondence.

The Time or Frequency Offset parameter represent information for synchronize links between two P2P devices.

The Pilot Signal Indication or Information parameter represents information about a pilot signal for measurement of a channel between the two P2P devices and measurement of a link SINR.

The Threshold for P2P Transmission parameter represents information about a threshold value with which the P2P device determines P2P transmission.

The Power Control Information parameter represents a power level for transmission of a pilot signal or data from one P2P device to the other.

The P2P Grouping/Paring ID parameter represents information about a P2P grouping/pairing identifier for identifying devices that perform P2P transmission.

The P2P Device Identifier parameter includes both a transmitter to transmit data and a receiver to receive data in P2P connection between two P2P devices.

Again returning to FIG. 1, the transmitter (Device 1 in FIG. 1) of the two P2P devices having received a P2P response message from the base station transmits a detection signal (a pilot signal/a P2P ranging or reference signal) for measurement of a channel between the two P2P devices, transmission power level and synchronization (S107). At this time, the two P2P devices (Devices 1 and 2) receives, from the base station through a P2P response message, a dedicated detection signal (dedicated pilot signal/dedicated P2P ranging signal) for P2P link in order to reduce interference by the link between other P2P devices and to allow the receiver (Device 2) to efficiently detect the detection signal transmitted from the transmitter (Device 1). In addition, the detection signal from the transmitter (Device 1) is transmitted through an allocated resource for P2P transmission received from the base station, i.e., a dedicated resource for communication between the two P2P devices (Device 1 and 2).

As described above, since the two P2P devices (Device 1 and 2) forms link connection through the detection signal, the transmitter (Device 1) may use a ranging signal as the detection signal. In the case that the ranging signal is used, the P2P device may additionally acquire synchronization information for P2P transmission through the ranging signal. Accordingly, using the time/frequency offset value received from the base station and the offset value measured through the ranging signal, the time/frequency synchronization for P2P transmission between the two P2P devices may be accurately performed. The ranging signal transmitted from one P2P device to the other P2P device is configured differently from the ranging signal that a conventional device transmits to the base station, and a dedicated ranging signal for P2P transmission may be configured and used. In addition, the dedicated ranging signal to be allocated for P2P transmission may be mapped to a P2P link connection identifier or may be allocated using the P2P link connection identifier.

In addition, the detection signal that the P2P transmitter (Device 1) transmits to P2P receiver (Device 2) may carry resource allocation information for P2P transmission. Herein, such resource allocation is information about resource allocation (data or control information) of the two P2P devices implemented to perform P2P transmission for the allocated resource from the base station or a part of the allocated resource.

After receiving a detection signal from the P2P transmitter (Device 1), the P2P receiver (Device 2) measures the status of link between the devices (Device 1 and Device 2) using the received detection signal (S109). The status value of the link measured by P2P receiver (Device 2) may include SINR, SNR, Carrier to Interface and Noise Ratio (CINR), interference level, path loss, and Channel Quality Indicator (CQI).

After measuring the status of link between the P2P devices, the P2P receiver (Device 2) transmits the link measurement information measured for the received detection signal to the P2P transmitter (Device 1) (S111). At this time, the P2P receiver (Device 2) may transmit the link measurement information measured using the information received from the base station to the P2P transmitter (Device 1) using the allocated detection signal.

Upon receiving the link measurement information from the P2P receiver (Device 2), the P2P transmitter (Device 1) performs synchronization for the P2P communication link using the received signal, and determines dedicated P2P transmission parameters (modulation and coding scheme (MCS), rate, power level, and MIMO) between the P2P transmitter (Device 1) and the P2P receiver (Device 2) for performing P2P transmission with the P2P receiver (Device 2) using the measurement information about the received link, for example, CQI, SINR, SNR, CINR, and interference level (S113)

Subsequently, the P2P transmitter (Device 1) transmits data to the P2P receiver (Device 2) through the received link measurement information or dedicated P2P transmission parameters (S115)

When transmission of data from P2P transmitter (Device 1) is successfully completed, the P2P receiver (Device 2) transmits a P2P transmission completion message to the base station to inform completion of P2P transmission (S117). In addition, after receiving, from the P2P receiver (Device 2), an acknowledge (ACK) signal for the data (or the last traffic) transmitted from the P2P transmitter (Device 1), the P2P transmitter (Device 1) may transmit a P2P transmission completion message to inform completion of P2P transmission. If a non-acknowledge (NACK) signal is received for the last traffic, the last traffic may be retransmitted, and the P2P transmission completion message may be transmitted to the base station after the ACK signal is received. Alternatively, the base station may overhear the ACK/NACK signal of the P2P receiver (Device 2). Such a P2P transmission completion message may be configured with 1 bit or 2 bits.

Figure 2:
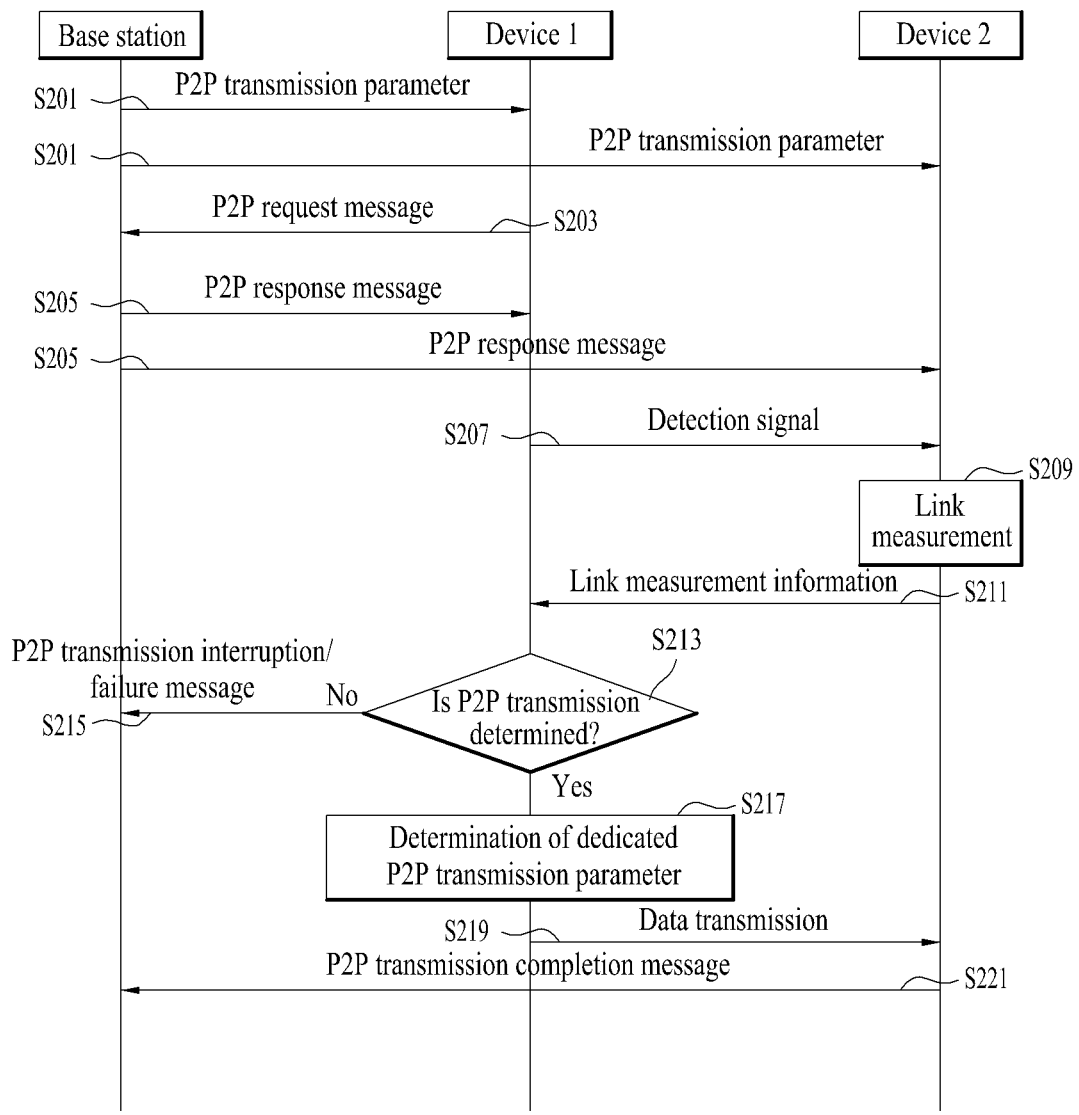
FIG. 2 is a view illustrating another method based on the first scheme for performing device-to-device communication according to one embodiment of the present invention.

FIG. 2 is a view illustrating another method based on the first scheme for performing device-to-device communication according to one embodiment of the present invention. In FIG. 2, steps from S201 to S211 are the same as the steps from S101 to S111 in FIG. 1, a description thereof will be omitted.

Upon receiving measurement or feedback information for the detection signal from the P2P receiver (Device 2), the P2P transmitter (Device 1) compares the received link measurement information with the threshold for determination of P2P transmission received from the base station in step S105, and determines whether to perform P2P transmission (S213). For example, in the case that SNR or CQI contained in the received information is lower than QoS for the data transmitted from P2P transmitter (Device 1) or the required power level, P2P transmission may be determined not to be performed. At this time, if the link measurement information does not meet the threshold for determination of P2P transmission, the P2P transmitter (Device 1) may retransmit the detection signal to the P2P receiver (Device 2) to receive the link measurement information again, and compare the received link measurement information with the threshold for determination of P2P transmission to determine whether to perform P2P transmission.

In step S213, if the link measurement information does not meet the threshold for determination of P2P transmission, the P2P transmitter (Device 1) transmits a P2P transmission interruption or failure message to the base station to inform the base station of interruption or failure of P2P transmission (S215)

On the other hand, in step S213, if the link measurement information meets the threshold for determination of P2P transmission, the P2P transmitter (Device 1) uses the link measurement information received from the P2P receiver (Device 2) to perform synchronization for the P2P communication link and determine dedicated P2P transmission parameters (modulation and coding scheme (MCS), rate, power level and MIMO) between P2P transmitter (Device 1) and P2P receiver (Device 2) to perform P2P transmission with P2P receiver (Device 2) (S217).

Since step S219 and step S221 are identical to step S115 and step S117, a description thereof will be omitted.

In the embodiments illustrated in FIGS. 1 and 2, the P2P receiver (Device 2) having received a P2P response message from the base station may transmit a rejection signal for the P2P operation to the base station, in contrast with the operation discussed above. That is, even if the P2P operation is determined by the base station, it may be performed depending on whether the device accepts the operation. For example, the P2P device (Device 2) may know information about the P2P operation indication and a device (Device 1) to perform P2P operation therewith through the P2P response message. At this time, in the case that the P2P device (Device 2) does not desire P2P communication with the other P2P device (Device 1) or in the case that the P2P device (Device 2) desires an operation (e.g., transmission and reception to and from the base station) other than P2P communication with the other P2P device, it may transmit a rejection signal/message (or NACK signal) to the base station for a P2P communication request from the other P2P device through a P2P response message received from the base station. When receiving the P2P rejection signal/message (or NACK signal) from the P2P target device (Device 2), the base station transmits, to the P2P request device (Device 1), an indication that the P2P operation cannot be performed through the received information. At this time, the signal that the base station transmits to the P2P request device (Device 1) may include a list of other devices for performing P2P communication in addition to the indication that P2P communication with the P2P target device (Device 2) is not possible. The P2P request device (Device 1) having received from the base station a signal indicating that the P2P communication cannot be performed re-performs steps S103 to S105 or steps S203 to S205 illustrated in FIGS. 1 and 2, performing operation to start P2P communication with the other P2P device.

In addition, if the P2P request device (Device 1) does not receive a rejection signal/message (or NACK signal) from the base station for a certain time (e.g., until the timer expires) after receiving a P2P response message, it may consider that the P2P operation is being performed in order to reduce signaling overhead between the base station and the P2P request device (Device 1). That is, the P2P request device (Device 1) may perform P2P communication when a certain time elapses after receiving the P2P response message from the base station.

2.2. Second Scheme for P2P Communication

Figure 3:
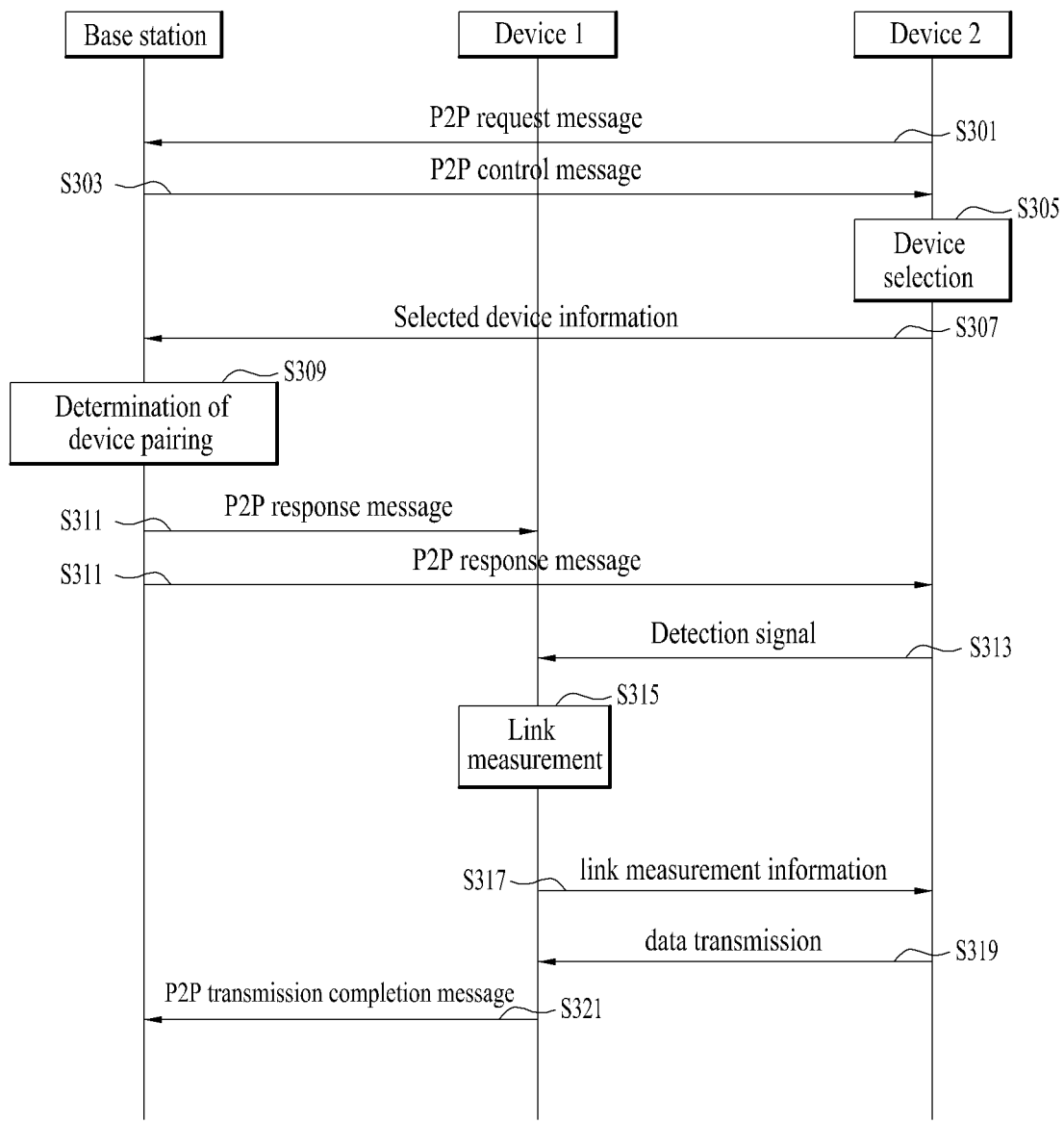
FIG. 3 is a view illustrating a method based on a second scheme for performing device-to-device communication according to one embodiment of the present invention.

FIG. 3 is a view illustrating a method based on a second scheme for performing device-to-device communication according to one embodiment of the present invention.

Referring to FIG. 3, the P2P device (Device 2) desiring P2P transmission transmits a P2P transmission request message (signal) to the base station by piggy-backing on a P2P request-dedicated resource allocated by the base station or a resource used for communication with the base station or by using a dedicated resource allocated for P2P transmission (S301). At this time, the P2P transmission request message includes a device identifier (device ID) or is configured using the device identifier. In addition, P2P transmission request message (P2P REQ) may be implemented using an existing bandwidth request message (BR REQ) or a ranging request message (ranging REQ).

When receiving the P2P transmission request message from the P2P device, the base station transmits a control message (signal) for P2P transmission to corresponding P2P devices (Device 2) through multicast or unicast signaling (S303). By means of the control message, the base station transmits a list of devices supporting P2P transmission or a list of devices neighboring the P2P device (Device 2) transmitting a P2P request message, and information about statuses of the devices.

The P2P device having received the control message for P2P transmission from the base station selects a device to perform P2P transmission in the received list of devices (S305), and transmits information about the selected P2P device to the base station (S307). Herein, the message (signal) that the P2P device transmits to the base station includes an indication or identifier of the P2P device (Device 1) desiring P2P communication. In addition, in consideration of interference with the other P2P device, the message may be configured with an orthogonal sequence, may be transmitted using sequences different between the P2P devices.

When receiving an indication or identifier of the target device for P2P transmission from the P2P device, the base station checks the current status (active mode, sleep mode or idle mode) of the P2P device or traffic loading and determines device pairing and P2P communication between devices (S309).

After performing selection or mapping of the target device for the P2P device having requested P2P transmission, the base station forms P2P connection by setting an identifier for a device pair to perform P2P communication and transmits a P2P response message (signal) to two P2P devices (S311)

Information which the base station transmits to the two P2P devices through the P2P response message is shown in Table 3 given below. Hereinafter, a description of parameters identical to those in the previous embodiments will be omitted.

TABLE 3

| Parameter | Contents |
| --- | --- |
| Resource Allocation for Transmission of P2P | Resource allocation information about a resource area for data transmission in P2P transmission |
| P2P Link Connection Identifier or Grouping/Paring ID | Information about a P2P link connection identifier or a grouping/identifier identifier |
| Pilot Signal Info between Device | Information about a pilot signal |
| Transmission Offset Value | Information about a transmission offset value |
| P2P Communication Confirm or Start Point Indication | Information for confirming P2P communication or indicating the start point |
| Transmission Power Level | Information about a transmission power level |
| Neighboring Device Info | Information about devices neighboring a P2P device |
| P2P Transmission Threshold | Information about a threshold value for determining P2P transmission |

The Resource Allocation for Transmission of P2P parameter represents resource allocation information about a resource area allocated for data transmission between P2P devices.

The P2P Link Connection Identifier or Grouping/Paring ID parameter represents information about an identifier for identifying a link or flow formed between P2P devices.

The Pilot Signal Info between Device parameter represents information about a pilot signal to measure the status or P2P device-to-device link. The pilot signal information includes a sequence indication or a shift/hopping value.

The Transmission Offset Value parameter represents a P2P transmission start point or information for link synchronization between two P2P devices. The transmission offset value includes a time or frequency offset value.

The P2P Communication Confirm or Start Point Indication parameter represents information to confirm start of P2P communication for a P2P device having transmitted a P2P transmission request message. Herein, the start point indicates the number of frame from which transmission starts between the two P2P devices.

The Transmission Power Level parameter represents a power level for the pilot signal or data transmission between the two P2P devices.

The Neighboring Device Info parameter represents information about P2P devices neighboring a P2P device having transmitted a P2P request message.

The P2P Transmission Threshold parameter represents a threshold value with which the P2P device determines whether or not P2P transmission is performed.

The P2P transmitter (Device 2) having acquired parameters for P2P device-to-device transmission through a P2P response message received from the base station transmits a detection signal (pilot signal/P2P ranging or reference signal) to measure device-to-device link based on the allocated resources (S313)

The P2P receiver (Device 1) having received the detection signal from the P2P transmitter (Device 2) measures the status of the link between the devices (Device 1 and Device 2) using the received detection signal (S315). The link measurement value measured by the P2P receiver (Device 1) may include SINR, SNR, CINR, interference level, path loss, and CQI. In addition, the P2P receiver (Device 1) may determine the signal transmission power using the power of the received detection signal.

The P2P receiver (Device 1) may know the start time of transmission of the detection signal through the information received from the base station, and maintain transmission synchronization between the P2P devices. In addition, the detection signal transmitted by P2P transmitter (Device 2) may be used to measure more accurate synchronization in P2P device-to-device communication. At this time, the P2P receiver (Device 1) may perform explicit (fine) synchronization using the synchronization information acquired through the signal that the other device (Device 2) has transmitted and the offset value that the base station has transmitted.

The P2P receiver (Device 1) having measured the inter-P2P device link measurement transmits the link measurement information measured for the received detection signal to P2P transmitter (Device 2) (S317).

The P2P transmitter (Device 2) having received measurement or feedback information for the detection signal from the P2P receiver (Device 1) transmits data to the P2P receiver (Device 1) using the feedback information and the allocated resource (S319). Herein, the P2P transmitter (Device 2) may transmit data after determining dedicated P2P transmission parameters (modulation and coding scheme (MCS), rate, power level, MIMO) between the P2P transmitter (Device 2) and the P2P receiver (Device 1) for performing P2P transmission with P2P receiver (Device 1) using the received link measurement information, for example, CQI, SINR, SNR, CINR, and interference level.

When transmission of the data from P2P transmitter (Device 2) is successfully completed, the P2P receiver (Device 1) transmits a P2P transmission completion message to the base station to inform completion of P2P transmission (S321). In addition, after receiving, from the P2P receiver (Device 1), an acknowledge (ACK) signal for the data (or the last traffic) transmitted from the P2P transmitter (Device 2), the P2P transmitter (Device 2) may transmit a P2P transmission completion message to inform completion of P2P transmission. If a non-acknowledge (NACK) signal is received for the last traffic, the last traffic may be retransmitted, and the P2P transmission completion message may be transmitted to the base station after the ACK signal is received. Alternatively, the base station may overhear the ACK/NACK signal of the P2P receiver (Device 1). Such a P2P transmission completion message may be configured with 1 bit or 2 bits.

Figure 4:
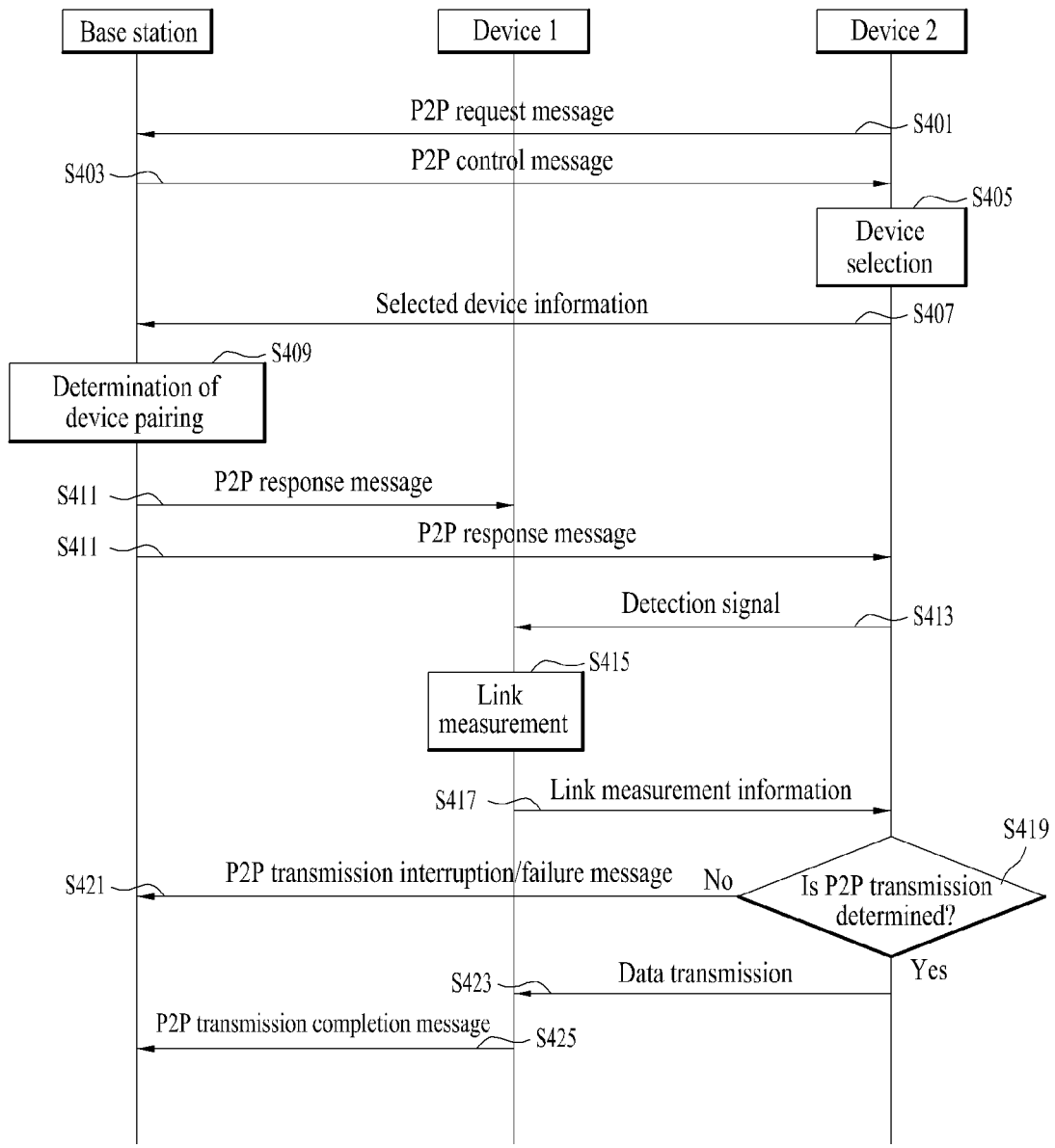
FIG. 4 is a view illustrating another method based on the first scheme for performing device-to-device communication according to one embodiment of the present invention.

FIG. 4 is a view illustrating another method based on the first scheme for performing device-to-device communication according to one embodiment of the present invention. Since step S401 to step S417 in FIG. 4 are identical to step S301 to step S317 in FIG. 3, a description thereof will be omitted.

The P2P transmitter (Device 2) having received measurement or feedback information for the detection signal from the P2P receiver (Device 1) performs determination for P2P data transmission using the received link measurement information and the received signal power (S419). At this time, if the link measurement information and the signal power do not meet the threshold for determination of P2P transmission, the P2P transmitter (Device 2) may retransmit the detection signal to the P2P receiver (Device 1) to receive the link measurement information again, and compare the received link measurement information and the signal power with the threshold for determination of P2P transmission to determine whether to perform P2P transmission.

In step S419, if the link measurement information and the received signal power do not meet the threshold for determination of P2P transmission, the P2P transmitter (Device 2) transmits a P2P transmission interruption or failure message to the base station to inform the base station of interruption or failure of P2P transmission (S421)

On the other hand, in step S419, if the link measurement information and the received signal power meet the threshold for determination of P2P transmission, the P2P transmitter transmits data to the P2P receiver (Device 1) using the feedback information and the allocated resource (S423). Herein, the P2P transmitter (Device 2) may transmit data after determining dedicated P2P transmission parameters (modulation and coding scheme (MCS), rate, power level, MIMO) between the P2P transmitter (Device 2) and the P2P receiver (Device 1) for performing P2P transmission with P2P receiver (Device 1) using the received link measurement information, for example, CQI, SINR, SNR, CINR, and interference level.

Since step S425 is identical to step S321 in FIG. 3, a description thereof will be omitted.

In the embodiments illustrated in FIGS. 3 and 4, the P2P receiver (Device 1) having received a P2P response message from the base station may transmit a rejection signal for the P2P operation to the base station, in contrast with the operation discussed above. That is, even if the P2P operation is determined by the base station, it may be performed depending on whether the terminal accepts the operation. For example, P2P device (Device 1) may know information about the P2P operation indication and a device (Device 2) to perform P2P operation therewith through the P2P response message. At this time, in the case that the P2P device (Device 1) does not desire P2P communication with the other P2P device (Device 2) or in the case that the P2P device (Device 1) desires an operation (e.g., transmission and reception to and from the base station) other than P2P communication with the other P2P device, it may transmit a rejection signal/message (or NACK signal) to the base station for a P2P communication request from the other P2P device through a P2P response message received from the base station. When receiving the P2P rejection signal/message (or NACK signal) from the P2P target device (Device 1), the base station transmits, to the P2P request device (Device 2), an indication that the P2P operation cannot be performed through the above information. At this time, the signal that the base station transmits to the P2P request device (Device 2) may include a list of other devices for performing P2P communication in addition to the indication that P2P communication with the P2P target device (Device 1) is not possible. The P2P request device (Device 2) having received from the base station a signal indicating that the P2P communication cannot be performed re-performs the steps illustrated in FIGS. 3 and 4 from the first step or re-performs step S305 or S405 using the received P2P control message.

In addition, if the P2P request device (Device 2) does not receive a rejection signal/message (or NACK signal) from the base station for a certain time (e.g., until the timer expires) after receiving a P2P response message, it may consider that the P2P operation is being performed base station, in order to reduce signaling overhead between the base station and the P2P request device (Device 2). That is, P2P request device (Device 2) may perform P2P communication when a certain time elapses after receiving the P2P response message from the base station 2.3. Third Scheme for P2P Communication FIG. 5 is a view illustrating a method based on a third scheme for performing device-to-device communication according to one embodiment of the present invention.

Figure 5:
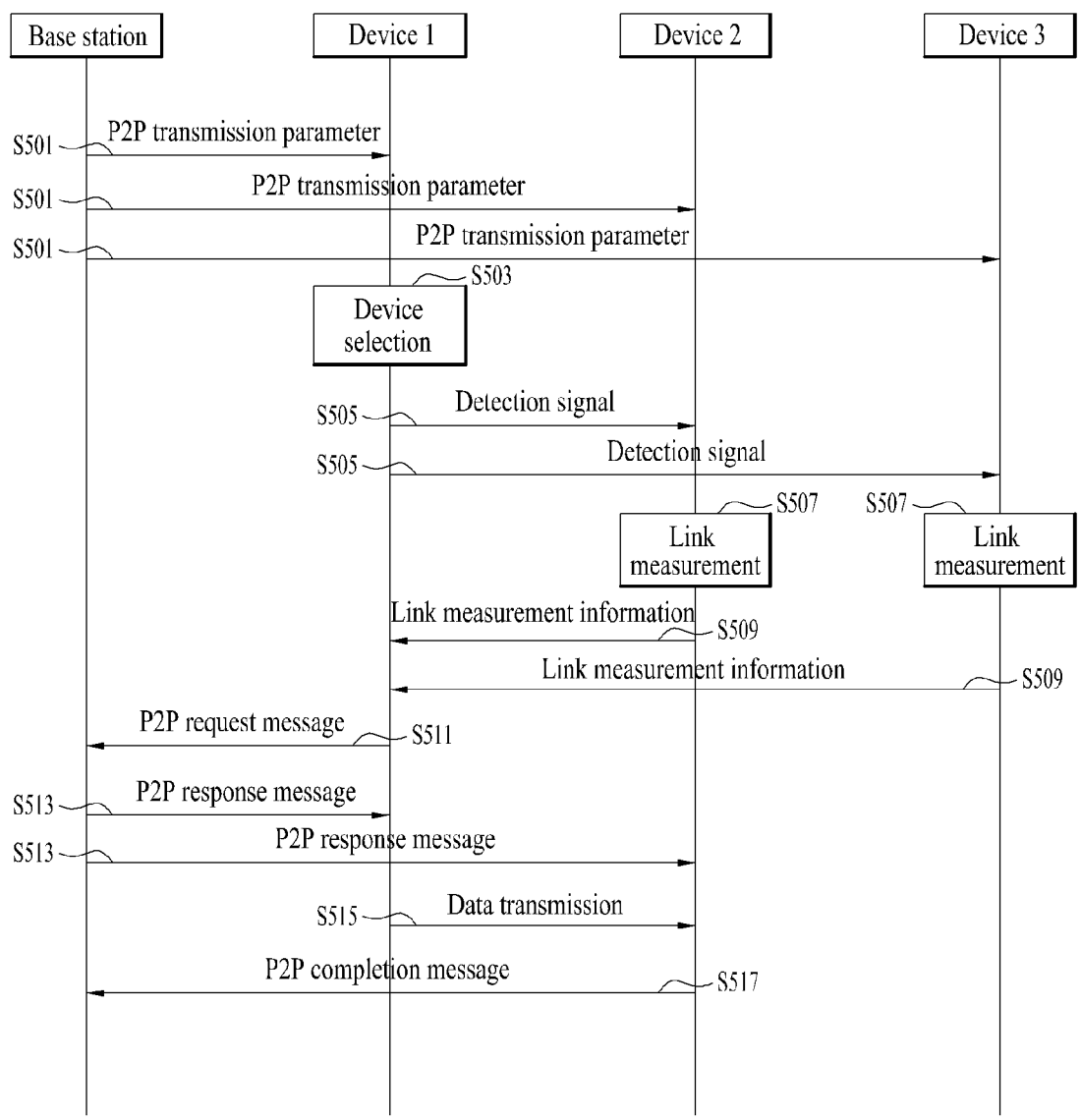
FIG. 5 is a view illustrating a method based on a third scheme for performing device-to-device communication according to one embodiment of the present invention.

Referring to FIG. 5, the base station transmits P2P transmission parameters to the devices (Device 1, Device 2 and Device 3) to perform P2P communication through broadcast signaling (S501). At this time, A-MAP, beacon signaling, PBCH, PDCCH, and paging signal may be used for broadcast signaling.

P2P transmission parameters which the base station transmits through broadcast signaling are shown in Table 4 given below. A description of parameters identical to those in the previous embodiments will be omitted.

TABLE 4

| Parameter | Contents |
| --- | --- |
| Resource Allocation or Dedicated Resource Allocation for Link Connection | Resource allocation information about a resource area for link connection |
| List of Device Identifier and Device Status | A list of P2P device identifiers and information about status of each device |
| Configuration of Detection Signal | Information about configuration of a detection signal |
| Time/Frequency Offset Value | Information about a time/frequency offset value |
| Timer Offset | Information about timer offset |
| P2P Transmit Power Level | Information about a P2P transmission power level |
| Start Time or Point Indication | Information for indicating start time or point |

The Resource Allocation or Dedicated Resource Allocation for Link Connection parameter represents resource allocation information about a common resource area or a dedicated resource area allocated for P2P device-to-device link connection.

The List of Device Identifier and Device Status parameter represents an identifier and an operational status of each P2P device.

The Configuration of Detection Signal parameter represents information about a detection signal (pilot signal) for measurement of the channel status or link status between two P2P devices. The Configuration of Detection Signal parameter includes a pattern of the detection signal, an indication of the detection signal, and a shift/hopping value.

The Time/Frequency Offset Value parameter represents information for implementing link synchronization between two P2P devices.

Again referring to FIG. 5, among P2P devices having received the P2P transmission parameters from the base station through broadcast signaling, a device (Device 1) desiring P2P transmission through the received P2P transmission parameters is selected in the list of P2P devices having received the P2P device desiring P2P connection (S503).

The P2P transmitter (Device 1) having selected a P2P device desiring P2P connection transmits a control message (signal) to the selected P2P device (S505). At this time, the control message that the P2P transmitter (Device 1) transmits includes a P2P transmission request and a device identifier or indication.

The P2P devices (Device 2 and Device 3) having detected the detection signal (or control signal) for P2P transmission transmitted from the P2P transmitter (Device 1) may recognize the device (Device 1) having transmitted the detection signal through the received detection signal, and perform measurement of the inter-P2P device link through the received detection signal (S507). The P2P device having received the detection signal may measure a power ratio or interference level for the control signal, and channel status or channel quality by performing link measurement, and may know the channel information from the detection signal.

The P2P devices (Device 2 and Device 3) having performed link measurement transmits, to the device (Device 1) having transmitted the detection signal, measurement information including a combination of one or more of the power ratio or interference level for the received detection signal, the channel status or channel quality, and channel information measured based on the received control signal, and device identifiers or indications of the devices (Device 2 and Device 3) having performed link measurement (S509). At this time, the information about the resource whose measurement information is transmitted by the P2P device may be received from the base station through a broadcast signal.

The P2P transmitter (Device 1) having received measurement information transmitted from the devices (Device 2 and Device 3) having received the detection signal may recognize the information transmitted thereto using the device identifiers or indication contained in the measurement information, and may set a power level for link communication and interference information for other links using the information received from other devices. When the P2P transmitter (Device 1) receives a desired signal among the signals containing the measurement information received from devices (Device 2 and Device 3), the P2P device transmits a P2P transmission request signal to the base station (S511). At this time, the interference level or SNR information recognized through the signal containing the measurement information received from the surrounding devices may also be transmitted over the request signal.

In addition, the P2P transmission parameters received from the base station may further include P2P transmission threshold information. The P2P transmitter (Device 1) may select a device to perform P2P communication by comparing the P2P transmission threshold with the measurement information received from devices (Device 2 and Device 3) having received the detection signal, and then transmit a P2P transmission request signal to the base station to start P2P communication with the selected P2P device.

The base station having received the request signal from the P2P device desiring P2P transmission transmits, to the two P2P devices (Device 1 and Device 2), a response signal containing parameters (MCS, power level, resource allocation, Multiple Input Multiple Output (MIMO), P2P grouping/identifier identifier (grouping/paring ID), etc.) for P2P transmission, through the information received from the P2P device (S513).

When P2P transmitter (Device 1) receives the response signal containing the parameters for P2P data transmission from the base station performs P2P transmission using the information contained in the response signal (S515).

When data transmission from the P2P transmitter (Device 1) is successfully completed, the P2P receiver (Device 2) transmits a P2P transmission completion message or indication (P2P_completion_indication) to the base station to inform completion of P2P transmission (S517). Alternatively, the P2P transmitter (Device 1) may transmit a P2P transmission completion message to inform completion of P2P transmission after receiving, from the P2P receiver (Device 2), an acknowledge (ACK) signal for the data (or the last traffic) transmitted from the P2P transmitter (Device 1). In the case that a non-acknowledge (NACK) signal is received for transmission of the last traffic, the last traffic may be retransmitted, and the P2P transmission completion message may be transmitted to the base station after the ACK signal is received. Alternatively, the base station may overhear the ACK/NACK signal of the P2P receiver (Device 2). Such a P2P transmission completion message or indication may be configured with 1 bit or 2 bits.

2.4. Fourth Scheme for P2P Communication

Figure 6:
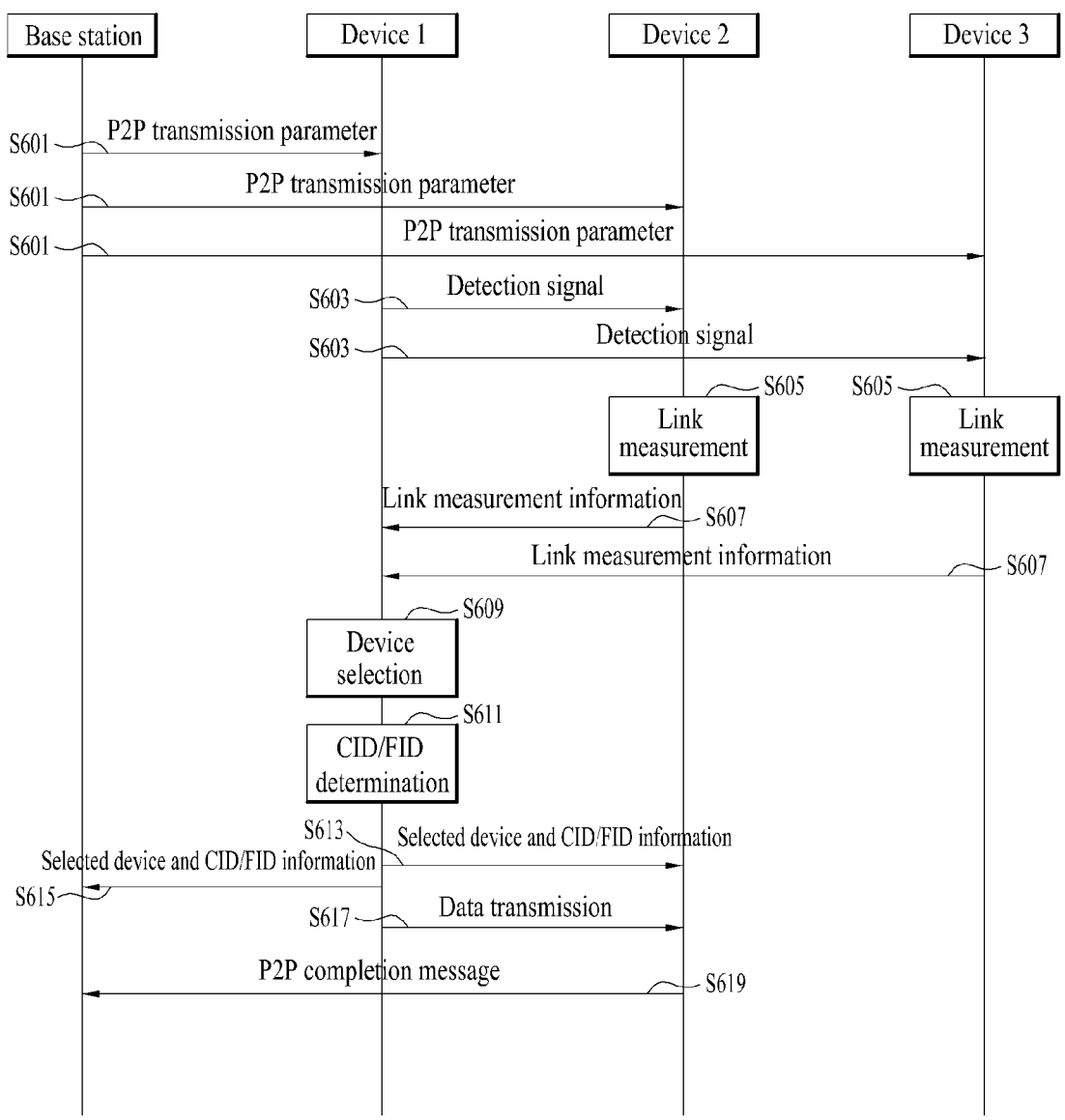
FIG. 6 is a view illustrating a method based on a fourth scheme for performing device-to-device communication according to one embodiment of the present invention.

FIG. 6 is a view illustrating a method based on a fourth scheme for performing device-to-device communication according to one embodiment of the present invention.

Referring to FIG. 6, the base station transmits P2P transmission parameters to the devices (Device 1, Device 2 and Device 3) to perform P2P communication through broadcast signaling (S601).

P2P transmission parameters which the base station transmits through broadcast signaling are shown in Table 5 given below. A description of parameters identical to those in the previous embodiments will be omitted.

TABLE 5

| Parameter | | Contents |
|---|---|---|
| Resource Allocation for P2P Transmission | | Resource allocation information about a resource area for data transmission in P2P transmission |
| Frame Format or Zone Configuration for P2P Transmission | | Information about frame format and zone configuration for P2P transmission |
| Configuration of Detection Signal | | Information about configuration of a detection signal |
| Time Parameters | Transmission Offset Value | Information about a transmission offset value |
| | Timer Offset | Information about the timer offset |
| | Start Time/ Point Indication | Information for indicating start time or point |
| P2P Transmission Threshold | | Information about a threshold value for determining P2P transmission |
| Transmission Power Level | | Information about a transmission power level |
| List of Connection Identifier or Flow Identifier or Unused CID or FID List | | Information about a list of connection identifiers/flow identifiers or a list of available connection identifiers/flow identifiers 목록에 대한 information |

The Resource Allocation for P2P Transmission parameter includes information about a dedicated resource with which P2P devices perform P2P transmission or information about indication of a zone of resource areas for P2P transmission.

The Frame Format or Zone Configuration for P2P Transmission parameter includes information about the structure of the frame or the time slot used for P2P transmission.

The Configuration of Detection Signal parameter represents information about a detection signal (or a control signal) for link measurement between two P2P devices. This parameter may be used in common in the cells or a different dedicated sequence may be used in each cell. In a cell, a P2P device creates a signal for measurement of a link with a function using information about the Configuration of Detection Signal parameter and the identifier of the device and uses the same in link measurement for P2P transmission. The Configuration of Detection Signal parameter includes a pattern of the signal, a sequence indication, a shift/hopping value, and power boosting.

The Time parameters include Transmission Offset Value, Timer Offset and Start Time or Point Indication. Herein, the Transmission Offset Value includes a time offset value and a frequency offset value, as information about basic synchronization for transmission of a P2P signal by two P2P devices. In addition, the Timer Offset is information about the time duration from the time a transmitter transmits a detection signal (or control signal) in P2P transmission until a response is received from a receiver. If the transmitter fails to receive the response signal before the timer expires, it retransmits the detection signal.

The P2P Transmission Threshold parameter is information about a threshold value for determining a P2P device for P2P transmission using the information received from the other P2P device. This information may be represented by SINR, signal power, interference level, QoS, etc.

The Transmission Power Level parameter indicates information representing a power level for a detection signal which the transmitter in P2P communication transmits.

The List of Connection Identifier or Flow Identifier or Unused CID or FID List parameter may represent an information list of a set of dedicated connection identifiers (CIDs) or flow identifiers (FIDS) for P2P transmission between P2P devices. Alternatively, this parameter may represent a list of available connection identifiers (CIDs) or flow identifier (FIDS) that are not used in a cell.

Again referring to FIG. 6, among the P2P devices having received the P2P transmission parameters from the base station through broadcast signaling, a device (Device 1) desiring P2P transmission through the P2P transmission parameters transmits the detection signal (the control signal or pilot signal) to at least one P2P device (Device 2 and Device 3) to discover the P2P device using the allocated resource (S603). Herein, the detection signal contains information such as a P2P transmission request message, P2P transmission device identifier and QoS, queue, load information such as latency, and is transmitted to perform inter-P2P device link measurement. Such a detection signal may be generated using the parameters received from the base station or using the parameters and a function with the device identifier.

In addition, the P2P transmission parameters received from the base station may further include information about a list of device identifiers and device statuses for devices supporting P2P transmission, and the device (Device 1) desiring P2P transmission may transmit a detection signal to at least one P2P device included in the list of device identifiers.

The P2P devices (Device 2 and Device 3) having received the detection signal from the P2P transmitter (Device 1) may know information such as an identifier of the device having requested P2P transmission and QoS through the received detection signal, and performs link measurement through the detection signal (S605). The P2P devices having received the detection signal may perform link measurement, thereby recognizing information the status of a link or channel between P2P devices. Such information may be presented in the form of SINR, CQI, an interference level, or an interference ratio.

The P2P devices (Device 2 and Device 3) having recognized the information about the link between P2P devices through the received detection signal transmits, to P2P device (Device 1) having transmitted the control signal, the device identifiers thereof and the information about the measured link (S607). At this time, in the case the detection signal is received from several P2P devices, the P2P devices may perform link measurement using the received detection signal, and transmit the information about the measured link and the device identifiers thereof only to the P2P devices satisfying the P2P transmission threshold received from the base station.

The P2P device (Device 1) having received the link measurement information for the detection signal may recognize the information about the link between devices through the received signal, and select a P2P device to perform P2P transmission using the received information and the P2P transmission threshold (S609).

The P2P device (Device 1) having selected a device for P2P communication determines a connection identifier (CID) or flow identifier (FID) for P2P link in the list of CIDs or FIDs received from the base station (S611). The determined CID or FID is used for P2P transmission between two P2P devices.

Subsequently, the P2P transmitter (Device 1) transmits, to the base station and the selected P2P device (Device 2), the information about the P2P device (Device 2) selected for P2P transmission and link connection information (a connection identifier or flow identifier) (S613 and S615). The P2P transmitter (Device 1) transmits the information to the base station and the selected P2P device (Device 2) through the unicast signaling.

At this time, the information is transmitted to the base station through a P2P communication confirmation signal (P2P_comm_confirm signal) (S615), and transmitted to the selected P2P device through a P2P communication indication signal (P2P_comm_indication signal) (S613). That is, different signals may be transmitted to the base station and the selected P2P device.

Herein, the signal for P2P transmission which the P2P transmitter (Device 1) transmits to the base station for P2P transmission, i.e., the P2P communication confirmation signal is configured with at least one parameter of an P2P receiver identifier (the selected P2P device), a CID or FID, and a P2P transmission start indicator. In addition, the signal may contain information about a resource to be used for P2P communication among the dedicated resources allocated in step S601.

In addition, the signal which the P2P transmitter (Device 1) transmits to the selected P2P device (Device 2), i.e., the P2P communication indication signal is configured with the control information for P2P transmission and the information transmitted to the base station (the information contained in the P2P communication confirmation signal).

The control information which the P2P transmitter (Device 1) transmits to the selected P2P device (Device 2) is shown in Table 6 given below. A description of parameters identical to those in the previous embodiments will be omitted.

TABLE 6

| Parameter | Contents |
| --- | --- |
| P2P Connection Identifier/P2P Flow Identifier | Information about a P2P connection identifier or P2P flow identifier |
| P2P Transmission Indicator/Start Indicator | Information about a P2P transmission indication or start indicator |
| P2P Transmission Power Control Info | Information about P2P transmission power control |
| Time Offset (Starting Time) | Information about time offset or starting time |

TABLE 6-continued

| Parameter | Contents |
| --- | --- |
| Resource Allocation | Resource allocation information about resource areas for data transmission in P2P transmission |
| P2P Transmission Parameters | Information about parameters for P2P transmission |

The Resource Allocation parameter represents allocation information for P2P data transmission for resources allocated by the base station through the broadcast information or a portion of the allocated resources. Herein, to avoid confrontation with another P2P link for the resources, the resource allocation information for P2P data transmission may also transmit the parameter to the base station through the signal transmitted to the base station (the P2P communication confirmation signal).

The P2P Transmission parameters represent information for P2P transmission between P2P devices, include MIMO and MCS information.

Meanwhile, the P2P transmitter (Device 1) may transmit the information for P2P transmission to the base station and the selected P2P device (Device 2) through one signal (e.g., a P2P communication indication signal (P2P comm._indication)).

The P2P device (Device 1) having transmitted an indication message for P2P transmission transmits P2P transmission data using the resources allocated by the base station or a portion of the allocated resources (S617). For example, the P2P device (Device 1) may use the information received in step S601 to determine resources and perform P2P communication, or may use resources for P2P communication allocated by the base station. That is, in the case that transmission is performed through scheduling of the base station, the P2P request device (Device 1) performs step S615 prior to S613 to transmit the signal first to the base station. At this time, to ensure efficient P2P operation, i.e., P2P communication between two P2P devices, the base station having received the information (an connection identifier or flow identifier and a P2P receiver identifier) from the P2P request device (Device 1) through the signal transmitted to the base station may allocate dedicated resources and indicate the same to the P2P request device (Device 1), or may recognize overlapping of the resources used by the P2P devices for P2P communication and reduce allocation of other resources to avoid confrontation in the case that the resources overlap those for another P2P device. The P2P request device (Device 1) having received the resource information from the base station may add the received information to the signal transmitted in step S613.

When data transmission from the P2P transmitter (Device 1) is successfully completed, the P2P receiver (Device 2) transmits a P2P transmission completion message or indication (P2P_completion_indication) to the base station to inform completion of P2P transmission (S619). Alternatively, the P2P transmitter (Device 1) may transmit a P2P transmission completion message to inform completion of P2P transmission after receiving, from the P2P receiver (Device 2), an acknowledge (ACK) signal for the data (or the last traffic) transmitted from the P2P transmitter (Device 1). In the case that a non-acknowledge (NACK) signal is received for transmission of the last traffic, the last traffic may be retransmitted, and the P2P transmission completion message may be transmitted to the base station after the ACK signal is received. Alternatively, the base station may overhear the ACK/NACK signal of the P2P receiver (Device 2). Such a P2P transmission completion message or indication may be configured with 1 bit or 2 bits.

3. Device that May be Implemented by the Present Invention

Figure 7:
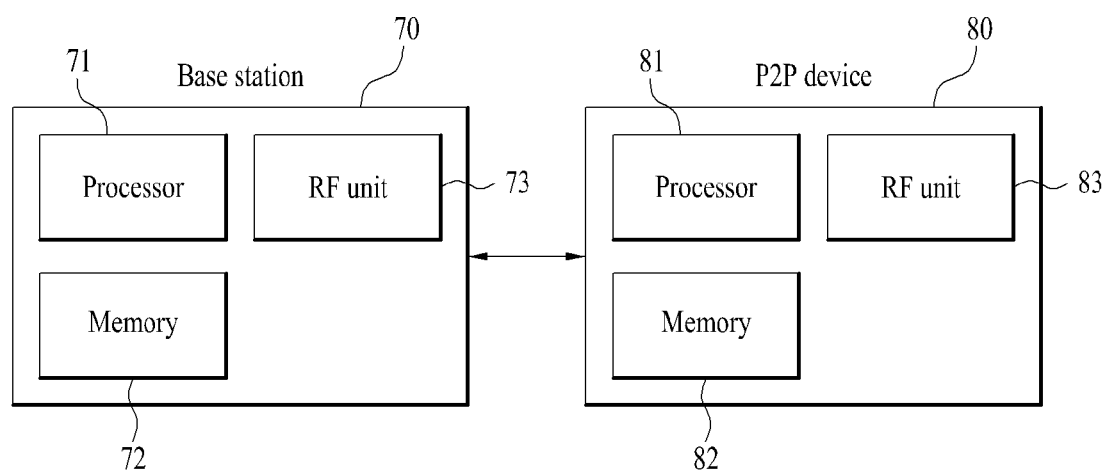
FIG. 7 is a block diagram illustrating an example of a wireless communication apparatus according to one embodiment of the present invention.

FIG. 7 is a block diagram illustrating an example of a wireless communication apparatus according to one embodiment of the present invention.

Referring to FIG. 7, the wireless communication system includes a base station 70, and a plurality of P2P devices 80 positioned within the coverage of the base station 70.

The base station 70 includes a processor 71, a memory 72, and a radio frequency (RF) unit 73. The processor 71 implements the proposed functions, steps and/or methods. The layers of a wireless interface protocol may be implemented by the processor 71. The memory 72 is connected to the processor 71 to store various kinds of information for driving of the processor 71. The RF unit 73 is connected to the processor 71 to transmit and/or receiver a wireless signal.

The P2P devices 80 include a processor 81, a memory 82, and an RF unit 83. The processor 81 implements the proposed functions, steps and/or methods. The layers of a wireless interface protocol may be implemented by the processor 81. The memory 82 is connected to the processor 81 to store various kinds of information for driving of the processor 81. The RF unit 83 is connected to the processor 81 to transmit and/or receiver a wireless signal.

The memories 72 and 82 may be inside or outside the processors 71 and 81, and may be connected to the processors 71 and 81 through various well-known means. In addition, the base station 70 and/or P2P devices 80 may have a single antenna or multiple antennas.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

It is apparent to those skilled in the art that the present invention may be carried out in other specific ways than those set forth herein without departing from the spirit and essential characteristics of the present invention. The above embodiments are therefore to be construed in all aspects as illustrative and not restrictive. The scope of the invention should be determined by reasonable interpretation of the appended claims and all changes coming within the meaning and equivalency range of the appended claims are intended to be embraced therein.

INDUSTRIAL APPLICABILITY

The data transmission and reception scheme for the wireless access system of the present invention is applicable to a variety of wireless communication systems including, for example, a 3GPP LTE/LTE-A system or an IEEE 802 system.

The invention claimed is:

1. A method for performing device-to-device (D2D) communication in a wireless access system supporting D2D communication, the method performed by a first device and comprising:
   receiving D2D communication parameters broadcast by a base station (BS), the communication parameters including resource allocation for the D2D communication and transmission power information for controlling power of the D2D communication;
   receiving predetermined signals from one or more devices by using the received communication parameters;
   obtaining link measurement information by measuring a status of a D2D link between the one or more devices and a first device of the one or more devices by using the predetermined signals;
   selecting a second device from the one or more devices for performing the D2D communication, the second device selected by using the link measurement information and signal received power threshold information; and
   performing the D2D communication based on the selection of the second device by setting a higher priority for communication with the BS than for the D2D communication,
   wherein the second device is selected when the link measurement information satisfies a predetermined threshold condition based on the signal received power threshold information.

2. The method according to claim 1, wherein the second device is selected when the link measurement information matches the signal received power threshold information.

3. The method according to claim 1, wherein the received communication parameters further include a list of D2D connection,
   identifiers and further comprising determining a connection identifier from the list for identifying D2D connection to the selected second device.

4. The method according to claim 3, further comprising transmitting a D2D communication confirmation signal to the BS and the second device, the signal containing at least an identifier of the second device, the determined connection identifier, or a start indication of the D2D communication.

5. The method according to claim 1, wherein the received communication parameters further include a list of devices supporting the D2D communication.

6. The method according to claim 1, further comprising:
   transmitting a D2D communication request signal to the BS to start the D2D communication; and receiving a communication response signal from the BS containing at least a modulation and coding scheme (MCS) for performing the D2D communication Multiple Input Multiple Output (MIMO), or connection identifier information.

7. The method according to claim 1, wherein the received communication parameters further include configuration information of the predetermined signals and time and frequency offset information for D2D synchronization.

8. An apparatus for performing device-to-device (D2D) communication in a wireless access system supporting D2D communication, the apparatus comprising:
 a radio frequency (RF) unit configured to transmit and receive information; and
 a processor configured to:
 control the RF unit to receive D2D communication parameters for broadcast by a base station (BS), communication parameters including resource allocation for the D2D communication and transmission power information for controlling power of the D2D communication;
 control the RF unit to receive predetermined signals from one or more devices by using the received communication parameters;
 obtain link measurement information by measuring a status of a D2D link between the one or more devices and a first device of the one or more devices by using the predetermined signals;
 select another device from the one or more devices for performing the D2D communication, the another device selected by using the link measurement information and signal received power threshold information; and
 perform the D2D communication based on the selection of the another device by setting a higher priority for communication with the BS than for the D2D communication,
 wherein the another device is selected when the link measurement information satisfies a predetermined threshold condition based on the signal received power threshold information.

9. The apparatus according to claim 8, wherein the another device communication is selected when the link measurement information matches the signal received power threshold information.

10. The apparatus according to claim 8, wherein the received communication parameters further include a list of D2D connection identifiers and the processor is further configured to determine a connection identifier from the list for identifying D2D connection to the selected another device D2D connection identifiers.

11. The apparatus according to claim 10, wherein the processor is further configured to control the RF unit to transmit a D2D communication confirmation signal to the BS and the another device, the signal containing at least an identifier of the another device, the determined connection identifier, or a start indication of the D2D communication.

12. The apparatus according to claim 8, wherein the received communication parameters further include a list of devices supporting the D2D communication.

13. The apparatus according to claim 8, wherein the processor is further configured to control the RF unit to:
 transmit a D2D communication request signal to the BS to start the D2D communication; and
 receive a communication response signal from the BS containing at least a modulation and coding scheme (MCS) for performing the D2D communication, Multiple Input Multiple Output (MIMO), or connection identifier information.

14. The apparatus according to claim 8, wherein the D2D communication parameters further include configuration information of the predetermined signals and time and frequency offset information for D2D synchronization.

* * * * *